April 25, 1950 H. C. SAVINO 2,505,069

AUTOMATIC TELEPHONE TRANSMITTER WITH PHOTOCELLS

Filed Feb. 19, 1948 3 Sheets-Sheet 1

INVENTOR
HENRY C. SAVINO
BY Richardson & Geier
ATTORNEYS

AUTOMATIC TELEPHONE TRANSMITTER WITH PHOTOCELLS

Filed Feb. 19, 1948

3 Sheets-Sheet 2

INVENTOR
HENRY C. SAVINO
BY Richardson & Geier
ATTORNEYS

AUTOMATIC TELEPHONE TRANSMITTER WITH PHOTOCELLS

Filed Feb. 19, 1948 3 Sheets-Sheet 3

INVENTOR
HENRY C. SAVINO
BY Richardson & Geier
ATTORNEYS

Patented Apr. 25, 1950

2,505,069

UNITED STATES PATENT OFFICE 2,505,069

AUTOMATIC TELEPHONE TRANSMITTER WITH PHOTOCELLS

Henry C. Savino, Jersey City, N. J.

Application February 19, 1948, Serial No. 9,439

15 Claims. (Cl. 179—90)

This invention relates to an automatic dialing device and refers more particularly to electronic dialing means for use in telephones and other apparatus.

An object of the present invention is the provision of an automatic dial which is comparatively simple in construction and effective in operation and which will not require repairs for lengthy time periods.

Another object is the provision of automatic electronic dialing means which are particularly suitable for the automatic dialing of telephone numbers.

A further object is the provision of an automatic telephone dial wherein a perforated card is utilized in conjunction with photoelectric cells and associated electrical circuits for the purpose of dialing automatically a telephone number which has been perforated upon the card.

Yet another object of the invention is to combine the standard telephone dial with an automatic dial in such manner that a user can employ at will either the manually operated standard dial or the automatic dial for the purpose of making a telephone call.

Still another object of the present invention is the provision of an automatic dialer employing perforated cards which can be conveniently removed and easily replaced by others.

Yet another object of the invention is the provision of an automatic dialer wherein push buttons are utilized for the purpose of automatically dialing a telephone number.

A still further object of the invention is the provision of means automatically re-setting the dialer at the end of a telephone conversation so that the mechanism is immediately available for another telephone call.

Yet another object of the present invention is the provision of an automatic dialer having an electrical circuit which is so constructed that an inadvertent pressing of a push button during a telephone call will not cause interruption of or interference with the call which is taking place.

Other objects of the present invention will become apparent in the course of the following specification.

The invention will appear more clearly from the following detailed description when taken in connection with the accompanying drawings showing by way of example a preferred embodiment of the inventive idea.

Figure 1:
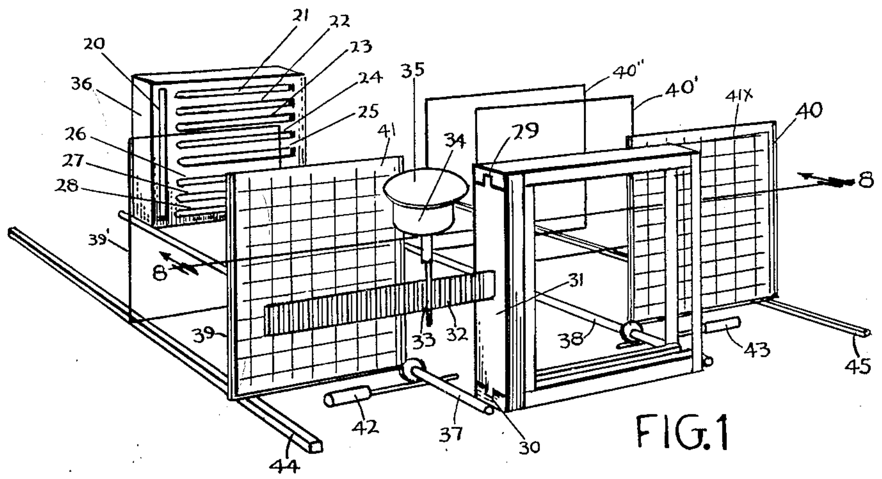
Figure 1 is a diagrammatic perspective view showing the general arrangement of the automatic dial and the various parts cooperating therewith.

The electronic automatic telephone dial shown in the drawings includes photoelectric cells arranged in the form of a vertical row 20 and horizontal rows 21 to 28 located one above the other. The rows of cells 20 and 28 are mounted in line with the track 29 and 30 through which the light beam housing 31 is moved. The housing 31 is connected for this purpose with a rack 32 meshing with a pinion 33. Pinion 33 is rotated by a motor 34. The rack and pinion arrangement is of standard construction and is illustrated diagrammatically in Figure 1.

A pulsator 35 is connected by any suitable means with the motor 34.

The rows of photoelectric cells 20 to 28 are carried upon a support 36 and, as already stated, are located opposite the housing 31.

Shafts 37 and 38 extend on opposite sides of the support or housing 36. The shafts 37 and 38 carry card holders 39, 39' and 40, 40', 40''. Obviously, the number of card holders upon the shafts 37 and 38 may be varied at will.

Figures 8, 9, 10:
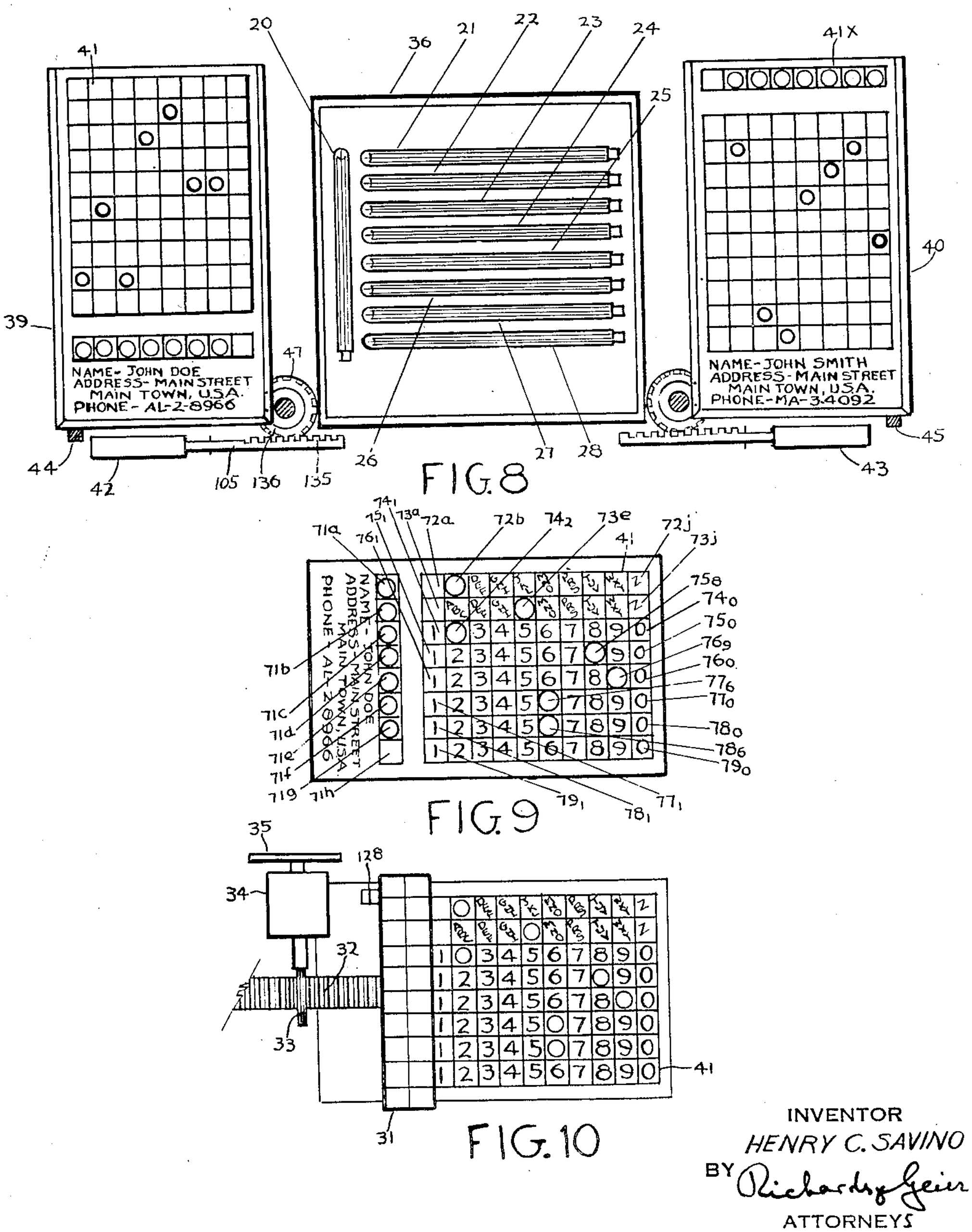
Figure 8 is a section along the line 8—8 of Figure 1.
Figure 9 is a diagram illustrating a typical dialing card.
Figure 10 is a front view illustrating the position of the card for dialing purposes.

The card holders 39 and 40 are used for holding perforated cards 41, 41X shown by way of example in Figures 8, 9.

Figures 1, 8 show the card holders 39 and 40 with their cards in their inoperative positions.

As will be described in detail hereinafter any one of the card holders 39 or 40 may be moved into its operative position by means of a solenoid 42 or the solenoid 43. A stop 44 serves as a rest for the card holders 39, 39' carried upon the shaft 37. A similar stop 45 is used as a rest for card holders 40, 40', 40'' carried by the shaft 38.

Figure 3:
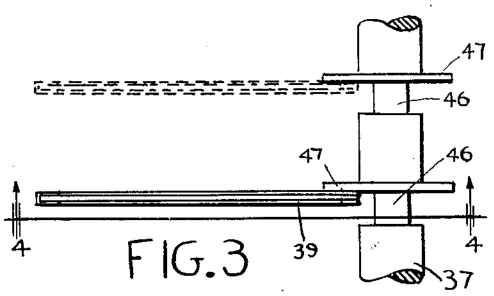
Figure 3 is a top view illustrating the card holder and the shaft connected therewith.

As shown in Figure 3, the shaft 37 has recessed portions 46 and carries adapter rings 47. Each adapter ring is firmly connected with its card holder 39.

Any suitable spring not shown in the drawings may be used for the purpose of returning the card holder to its initial operative position after the dialing operation has been completed.

It is apparent that the card holders 40, 40', 40'' are arranged in a similar manner upon the shaft 38.

Figure 2:
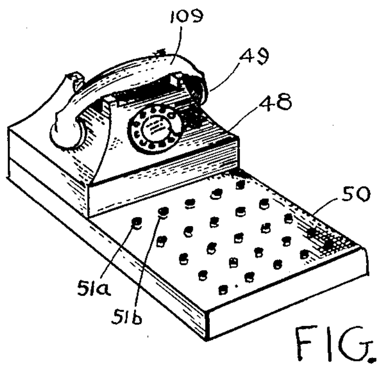
Figure 2 is a perspective view illustrating a standard telephone dial set combined with push buttons for the automatic dialing.

Figure 2 illustrates a typical telephone set 48 provided with a dial 49. For the purpose of automatic dialing, the telephone is combined with a board 50 provided with push buttons 51*a*, 51*b*, etc.

The number of push buttons should be equal to that of the cards or card holders carried by the shafts 37 and 38.

Figures 4, 5, 6, 7:
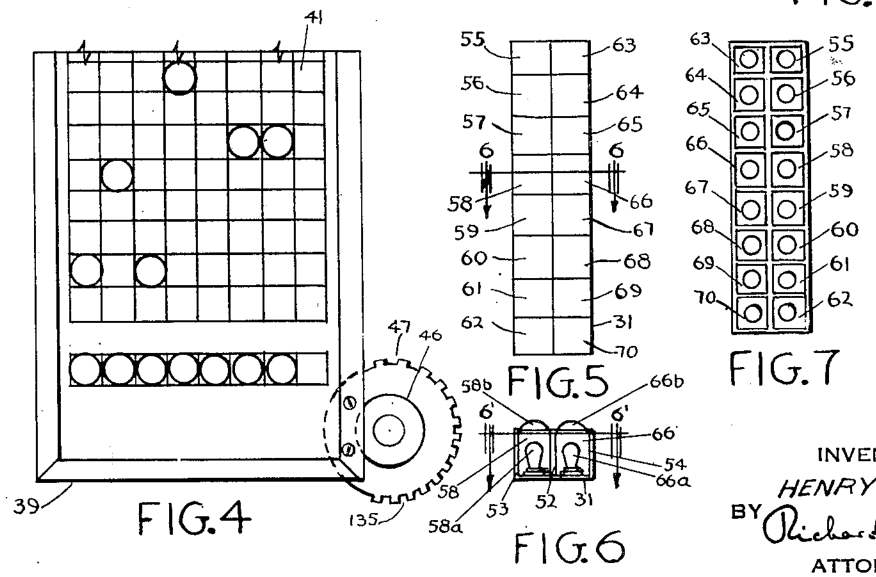
Figure 4 is a section along the line 4—4 of Figure 3.
Figure 5 is a diagram illustrating the cell housing and the operation of the light beams.
Figure 6 is a section along the line 6—6 of Figure 5.
Figure 7 shows the chambers section along the line 6′—6′ of Figure 6 utilized for the purpose of activating photoelectric cells.

The housing 31 for the light beams is illustrated in greater detail in Figures 5, 6 and 7.

A partition 52 divides the housing 31 into two vertical columns 53 and 54.

Horizontal partitions divide the vertical column 53 into 8 chambers designated by numerals 55 to 62 in the drawings. Similarly, the column 54 is divided by horizontal partitions into chambers 63 to 70. All of these light chambers are similarly constructed.

Figure 6 shows in cross section the light chambers 58 and 66.

The light chamber 58 contains a light source 58*a*, the light of which is focused by a lens 58*b*. Similarly, the chamber 66 contains a source of light 66*a* and a lens 66*b*. All other light chambers are provided with similar light sources and lenses.

It should be noted in this connection that the light emanating from the light chambers 55 to 62 is associated with the vertical photo cell row 20 while light beams from light chambers 63 to 70 are associated with the horizontal photoelectric cell rows 21 to 28.

The card 41 shown by way of example in Figure 9 includes 8 horizontal rows and 12 vertical columns. The first column is provided with squares 71*a* to 71*h* and is used as signaling means for the starting of the dialing as will be described in detail hereinafter.

The first two horizontal columns have squares 72*a* to 72*j* and 73*a* to 73*j*. These squares are provided with letters which appear on the usual dial and are used for the same purpose.

The following 6 horizontal rows are divided into squares with 10 squares in each row. These squares have been designated as $74_1$ to $74_0$; $75_1$ to $75_0$; $76_1$ to $76_0$; $77_1$ to $77_0$; $78_1$ to $78_0$ and $79_1$ to $79_0$. As shown in Figure 9 the sequence of the last mentioned 6 horizontal rows is numbered from 1 to 10 and these numbers correspond to those used in the dialing.

It is thus apparent that with the described arrangement any telephone number having two letters and six numerals can be conveniently dialed.

Obviously, the number of the letters and numerals may be varied at will by a suitable adjustment of the horizontal rows and vertical columns.

Let it be assumed by way of example that the card is to be perforated for the dialing of the telephone number AL 2-8966. In that case the square 72*b* is perforated to indicate the letter A. Furthermore, the square 73*e* will be perforated to correspond to the letter L. In the third row the square $74_2$ will be perforated to correspond to the numeral 2. Similarly, the square $75_8$ will be perforated to correspond to the numeral 8; the square $76_9$ will be perforated to correspond to the numeral 9; the square $77_6$ will be perforated to correspond to the numeral 6; the square $78_6$ will be perforated to correspond to the second numeral 6.

As far as the first vertical column is concerned, the squares 71*a* to 71*h* of that column are perforated whenever a perforation appears on the horizontal rows located opposite these squares. In the example illustrated, each of the first 7 horizontal rows is provided with a perforation and therefore the square 71*a* to 71*g* of the first vertical column is also perforated. The square 71*h* is not perforated since no perforations appear upon the last horizontal row.

The perforations in the vertical column 71*a* to 71*h* cooperate with the light emanating from the light chambers 55 to 62. The perforations provided in the horizontal rows cooperate with the light emanating from the light beam chambers 63 to 70.

Figures 11, 12, 13, 14, 14A, 15, 16:
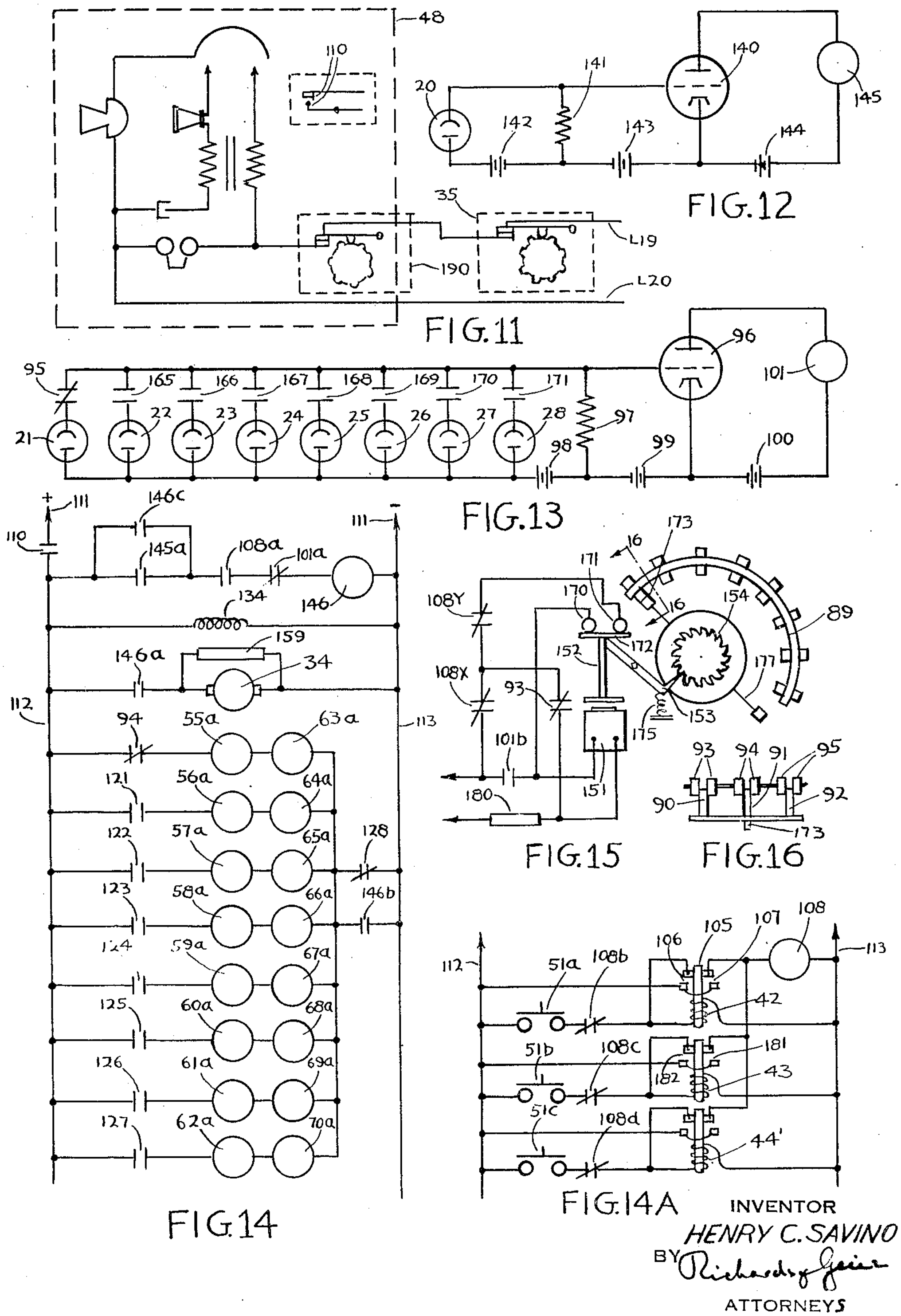
Figure 11 is a diagram illustrating the subscriber phone circuit and the contacts of the automatic dialer connected therewith.
Figure 12 is a diagram illustrating a photoelectric cell circuit used to energize relays.
Figure 13 is a diagram illustrating the circuit of the photoelectric cells.
Figure 14 is a diagram illustrating the electrical circuits required for performing the dialing operation.
Figure 14A is a diagram illustrating the electrical circuit of the push buttons shown in Figure 2.
Figure 15 is a diagram illustrating the stepper and the various elements used for actuating the same.
Figure 16 is a section along the line 16—16 of Figure 15.

Light emanating from the light chambers actuates by the photoelectric cell 20 shown in Figure 12 and photoelectric cells 21 to 28 shown in Figure 13. It is apparent that a light beam from one of the light chambers 55 to 62 which encounters one of the perforations 71*a* to 71*h* in its path will be able to strike the photoelectric cell 20 located in the path of the light. Similarly, a light beam emanating from one of the light beam chambers 63 to 70 and passing through any of the perforations provided in the squares 72*a* to $79_0$ of the card 41 will strike one of the photoelectric cells 21 to 28.

As will be described in detail hereinafter, the housing 31 carrying the light beam chambers is caused to scan over a card located in its operative position for the purpose of energizing the photoelectric cells in the required squares.

As shown in Figure 15, the device further includes a stepper switch 89 which is provided with brushes 90, 91 and 92 closing pairs of contacts 93, 94 and 95 (Fig. 16).

As shown in Figure 13, contacts 95 are connected to the photoelectric cell 21 and to the grid of a tube 96 to which a resistance 97 is also connected. Batteries or other sources of electricity 98, 99 and 100 are connected to the tube 96 and to a relay 101.

The circuit shown in Figure 13 is one used to pick up relay 101 when a light beam strikes a photoelectric cell.

A push button 51*a* shown in Figure 14*a* is connected with contacts 108b and a solenoid 42 which is used to actuate a plunger 105. The plunger 105 establishes an electrical connection between contacts 106 and 107 thereby energizing relay 108.

It should be further noted that the telephone receiver 109 shown in Figure 2 cooperates with contacts 110 shown on Figure 11 so that as soon as a receiver is raised the contacts 110 close and thereby place the circuits of Figures 14 and 14a across a voltage source 111. The source 111 is connected with wires 112 and 113 which form a plurality of circuits shown on Figures 14 and 14a. Included in these circuits are contacts 121 to 127, light sources 55a to 70a shown in Figure 14 and further push buttons 51b and 51c connected with solenoids 42 and 43 respectively. The operation of the device is as follows:

Let it be assumed that the telephone number AL 2-8966 is to be dialed automatically. This number is provided upon a card 41 shown in Figure 9.

In the starting position the stepper switch 89 is in the position shown in Figures 15 and 16, namely, with the brushes 90, 91 and 92 closing the contacts 93, 94 and 95. Since the contacts 95 are closed, the photoelectric cell 21 shown in Figure 13 is connected to the grid of the tube 96 and to the batteries 98, 99 and 100.

The operator now presses the button 51a shown on Figures 2 and 14a. Then the solenoid 42 is energized so that the plunger 105 is attracted and establishes an electrical connection between the contacts 106 and 107. At the same time the moving of the plunger 105 causes the ratch 136 to actuate the gear 135 of the card adapter 47 (Fig. 8). This causes the card 41 to be rotated clockwise about its shaft to an extent of 90° thereby moving it into an operative position such as shown by Figure 10.

The closing of the contacts 106 and 107 will establish a holding circuit for the solenoid 42 and energize relay 108. Thus the solenoid 42 will remain energized even when the pressure against the button 51a is released. As soon as the relay 108 is energized it will close its contacts 108a and open the contacts 108b, 108c, 108d etc. The number of these contacts depends on the number of push buttons which is open. It is apparent that the opening of these contacts will prevent the actuating of any other solenoid should the operator inadvertently depress one of the buttons 51b, 51c, etc., while the telephone is being used. Contacts 108X and 108Y also open when relay 108 is energized and their function will be described later.

Figure 14 shows that as soon as the contacts 110 are closed by the lifting of a telephone receiver, the lights 55a and 63a of the light chambers 55 and 63 will be also lit. Therefore the beam of light would be directed from the chamber 55 and will strike the photoelectric cell 20 located upon the support 36. As shown in Figure 12, the photoelectric cell 20 is connected with the grid of a tube 140 and is also connected with a resistance 141 as well as sources 142, 143 and 144 of electrical energy. The relay 145 is also included in the circuit so that as soon as the photoelectric cell 20 is energized the relay 145 will be also energized and will close its contact 145a shown in Figure 14. At this time an electrical circuit will be established which includes the source 111, and the contacts 110, 145a, 108a and 101a, thus energizing the relay 146. The relay 146 will now close the contacts 146a, 146b and 146c (Fig. 14).

The closing of the contacts 146a provides a connection between the motor 34 and the source 111 so that the motor is energized. The closing of the contacts 146b will maintain a circuit to the lights 55a and 63a when the contact 128 is opened at the time the housing 31 begins to move away from its original position. The closing of the contacts 146c provides a holding circuit for the relay 146 at the time when the contacts 145a are open, when the housing 31 is moved away from its original position, so that the light from the source 55a will no longer strike the photoelectric cell 20.

In the position shown in Figure 10, the housing 31, the motor 34 and the pulsator 35 are placed at the beginning of the scanning of the card 41. It will be noted that in its starting position, light beam from the chamber 55 passes through the perforation of the square 71a and strikes the photoelectric cell 20. The light beam from the light chamber 63 cannot strike the photoelectric cell 21 until the casing 31 is moved to the right (looking in the direction of Figure 10) and until the beam of light strikes the perforation of the square 72b in the first horizontal row. This movement of the housing 31 is accomplished by the motor 34 which rotates its pinion 33 and thus moves the rack 32 which is connected with the housing 31.

The housing 31 moves along the tracks 29 and 30 until the light beam emanating from the chamber 63 passes through the first perforation in the square 72b and strikes the photoelectric cell 21. The rotation of the motor 34 actuates the pulsator 35 which turns the dial to an extent corresponding to the first number to be dialed.

As soon as the light beam from the chamber 63 strikes the photoelectric cell 21, the relay 101 is energized due to the provision of the electrical circuit which includes the resistor 97 and the voltage sources 98, 99 and 100. As soon as the relay 101 is energized, its contact 101a is open thereby de-energizing the relay 146. The opening of the relay 146 opens the contacts 146a so that the circuit of the motor 34 is also open. The motor 34 stops very quickly due to the provision of the dynamic braking resistance 159 and the fact that the field of motor 34 is constantly connected to voltage source 111 (Figure 14).

The closing of the relay 101 will also close the contacts 101b (Fig. 15) thereby energizing the stepper coil 151. The coil 151 will attract the arm 152 causing the pawl 153 to engage the gear 154 and to turn the stepper one step. Then the brushes 90, 91 and 92 will be moved so that they can engage the contacts 121 which re-connect to the light sources 56a and 64a. At the same time the contacts 94 open. The contacts 93 and 95 open at the same time. It is apparent that now the circuit to the light sources 56a and 64a is closed. Similarly, after the contacts 95 are open by the forward movement of the brush the contacts 165 connected to the photoelectric cell 22 will be closed. Thus, the photoelectric cell 22 is now in position to become energized. Since the contacts 121 are now closed, the lamps 56a and 64a will be lit when the housing 31 returns to its original position so that the contacts 128 will be closed once again to complete the circuit to the light sources.

The circuit is open when the contacts 146b are open and remains open until the housing 31 returns to its original position. This safety feature prevents any photoelectric cell from being energized during the return movement of the housing 31.

The return movement of the housing 31 is caused by the spring action of the pulsator 35 when the motor 34 is de-energized by the opening of the contacts 146.

When the housing 31 reaches its original position and the contacts 128 are closed, the circuit to the light beams emanating from chambers 56 and 64 is completed. The light beam from the chamber 56 strikes once more the photoelectric cell 20 although the light beam now passes through a different perforation in the card. The motor 34 is once more energized and then the housing 31 moves forward until the light beam from the chamber 64 strikes the photoelectric cell 22 through the aperture 73*e* in the second horizontal row of the card 41 (Figure 9). When the photoelectric cell 22 is energized by the light beam, the relay 101 is energized and operates all its contacts. The motor 34 will become de-energized and the stepper switch 89 will be moved one step forward to open the contacts 121 and 165 and to close the contacts 122 and 166. Then light from the lamps 57*a* and 65*a* is ready to actuate the photoelectric cells 20 and 23.

It is apparent that this process will continue so long as there are perforations in the vertical column of the card. It is further apparent that the contacts 165 to 171 correspond to the photoelectric cells 22 to 28 respectively while each of the pair of light chambers arranged vertically within the casing 31 has corresponding contacts designated by numerals 94 and 121 to 127.

The dialing is completed when a light beam from the light chamber 62 cannot pass through the card 41 for the reason that there are no perforations in the square 71*h*.

When the call is completed and the user places the receiver 109 upon its hook, the contacts 110 are opened and thus the circuit shown in Figures 14 and 14*a* is also open. It is apparent that the solenoid 42 is de-energized at the same time along with the relay 108. As soon as the solenoid 42 is de-energized, the card 41 is returned to its initial position by its spring, striking the rail 44. This inoperative position of the card is illustrated in Figure 1 and Figure 8.

As soon as the relay 108 is de-energized, the contacts 108*a* are opened while the contacts 108*c*, 108*d*, etc. are closed, the number of the contacts depending on the number of push-buttons. The closing of the contacts 108*x*, 108*y* shown in Figure 15 starts the automatic re-setting of the stepper switch (Fig. 15). It is apparent that the closing of the contacts 108*x* and 108*y* completes the circuit to the solenoid 151 since electrical current will flow through the contacts 108*x*, 108*y*, the contacts 170 and 171 and the contact bar 172 carried by the arm 152. The contact bar 172 will move along with the stepper arm 152 so that when the stepper arm engages the ratch 154 the brush arm 173 carrying the brushes 90, 91 and 92 will move forward one step, whereupon the circuit is broken at the contacts 170 and 171.

Then the spring 175 will cause the stepper arm 152 to return to its original position whereupon the circuit is again completed and the stepper coil 151 is energized. Thus, the intermittent closing and opening of the circuit and a stepwise movement of the stepper 89 takes place until the brush arm 177 is moved into a position wherein its brushes (not shown) close the contacts 93, 94 and 95. It should be noted in this connection that the brush arm 177 is situated diametrically opposite the brush arm 173 and is similar to it in construction.

When the contacts 93 are closed by the brush 90, the stepper coil 151 is short-circuited and at that time the re-setting operation of the stepper switch is completed.

The resistance 180 is connected in series with the short circuit of the coil 151 for the purpose of limiting the current.

When the stepper 89 is re-set for another operation, the contacts 94, 95 and 93 are closed. It should be noted that the short circuit to the stepper coil 151 is made ineffective when dialing since the contacts 108*x*, 108*y* are open in view of the fact that the relay 108 is energized during the dialing operation. Should the operator desire to dial automatically another telephone number, a different card provided with the proper perforations is placed in the card holder 40 and to dial this number the user presses down the push button 51*b*. Thereupon the solenoid 43 is energized and turns the card holder 40 thereby placing the card in its operative position. As shown in Figure 14, the contacts 181 and 182 provide a holding circuit for the solenoid 43. The relay 108 is energized as before and the operation of the device is repeated in the described manner.

It should be noted that as each of the cards is swung into its operative position it will occupy the same position in relation to the photoelectric cells 20 to 28 and to the housing 31.

Thus the present invention provides an automatic dialing device which can be used for dialing any amount of telephone numbers, the amount depending upon the number of cards which can be placed between the photoelectric cells and the scanning light beam. Each of the cards mounted in the card frame is operated by a separate push button. When the automatic dialing of a circuit telephone number is no longer required, the corresponding card can be removed from its card frame and replaced by another card.

It is further apparent that the usual manual use of the dial 48 shown in Figure 2 is in no way interfered with by the present device since the user rotating by hand the dial 49 will cause a pulsator 190 to open and close the telephone circuit. The pulsator 190 is connected in series with the pulsator 35 used for automatic dialing. Lines L19, L20 are the regular telephone wires.

It is apparent that the illustration shown above has been given by way of illustration and not by way of limitation and that it is subject to variations and modifications without departing from the scope of the present invention. All of such variations and modifications are to be included within the scope of the present invention.

What is claimed is:

1. In an automatic dialing system, in combination with a card having perforations formed therein and corresponding to the indicia of a telephone number to be dialed; said card further having signaling perforations formed therein and equal in number to said indicia perforations, a light emitting scanning device movable over said card, each of said signaling perforations corresponding to a separate indicia perforation and being located in advance thereof in the path of said scanning device, the distance between a signaling perforation and the corresponding indicia perforation being proportional to the extent of the duration of the time required to dial said indicia, a motor connected with said scanning device for moving the same, a dial turning pulsator operatively connected with said motor, light sensitive means connected with said motor to start said motor and said pulsator when light emanating from said scanning device and passing through a signaling perforation of said card strikes said light sensitive means and other light-sensitive means connected with said motor to switch off said motor when light emanating from said scanning device and passing through an indicia perforation corresponding to the last mentioned signaling perforation strikes the last mentioned light sensitive means.

2. In an automatic dialing system in combination with a card having perforations formed therein and corresponding to the indicia of a telephone number to be dialed; said indicia perforations being arranged in different horizontal rows, said card further having signaling perforations formed therein, each of said signaling perforations being located in alignment with a row having an indicia perforation, said signaling perforations being located in a vertical column, a light emitting scanning device movable over said card, each of said signaling perforations being located in advance of its indicia perforations in the path of said scanning device, the distance between a signaling perforation and the corresponding indicia perforation being proportional to the extent of the turning of a dial required to dial said indicia, a motor actuating said scanning device, a dial turning pulsator operatively connected with said motor, light sensitive means connected with said motor to start said motor and pulsator when light emanating from said scanning device and passing through a signaling perforation strikes the light sensitive means, and other light sensitive means connected with said motor to switch off said motor when light emanating from said scanning device and passing through an indicia perforation corresponding to the last mentioned signaling perforation strikes said scanning device.

3. In an automatic dialing system, in combination with a card having indicia perforations formed therein and corresponding to the indicia of a telephone number to be dialed, said card also having signaling perforations formed therein and equal in number to said indicia perforations, a scanning device movable over said card, light rays emitting means carried by said scanning device and movable therewith, photoelectric cells located substantially opposite the path of said scanning device and adapted to be engaged by said light rays passing through perforations formed in said card, each of said signaling perforations corresponding to a separate indicia perforation and being located in advance thereof in the path of said scanning device, the distance between a signaling perforation and the corresponding indicia perforation being proportional to the extent of the turning of a dial required to dial the last mentioned indicia, a motor actuating said scanning device, dial turning means connected with said motor, motor-starting means connected with said motor and one of said photo cells and actuated by the energization of the latter and motor-starting means connected with the last mentioned means and other photo cells and actuated by the energization of said other photo cells.

4. In an automatic dialing system, in combination, dial-actuating means, a motor connected with said dial-actuating means, a pinion driven by said motor, a rack meshing with said pinion, a light chamber-carrier connected with said rack and having a plurality of light chambers formed therein, light source in said chambers, a plurality of light responsive cells, means connected with said cells and said motor for switching said motor on and off, and means associated with said light chambers for selectively actuating said cells.

5. In an automatic dialing system, in combination with a card having indicia perforations formed therein and corresponding to the indicia of a telephone number to be dialed, said indicia perforations being arranged in rows, said card further having signaling perforations formed therein, each of said signaling perforations being located in a separate row having an indicia perforation, a scanning device movable over said card, photo cells light chambers carried by said scanning device and arranged in two columns in alignment with said photo cells, each of said signaling perforations corresponding to a separate indicia perforation and being located in advance thereof in the path of said scanning device, the distance between a signaling perforation and the corresponding indicia perforation being proportional to the extent of the turning of a dial required to dial said indicia, a dial-turning motor, means connected with said motor and one of the photo cells for starting said motor, and means connected with the last mentioned means to energize one of the other photo cells by light passing through any one of said signaling perforations, for stopping said motor.

6. In an automatic dialing system, in combination with a dial; a motor, a motor shaft connected with said motor and said dial, a pinion driven by said motor shaft, a rack meshing with said pinion, a housing connected with said rack and movable therewith, a plurality of light chambers carried by said housing, light responsive cells located opposite said chambers, separate contacts connected with each cell, means connected with some of said cells and some of said contacts for starting said motor, means actuating the last-mentioned cells, means consecutively closing the last-mentioned contacts to start the motor a number of times, means connected with other cells and contacts for stopping said motor, means selectively actuating said other cells, and means closing said other contacts while said other cells are being actuated.

7. In an automatic dialing system, in combination, a dial actuating motor, a pinion driven by said motor, a rack meshing with said pinion, a housing connected with said rack and movable therewith, a plurality of light chambers carried by said housing, a plurality of light responsive cells located opposite said housing, means connected with one of the said cells and said motor for starting said motor, a plurality of contacts connected with the other cells, the number of contacts corresponding to that of said other cells, a stepper device, means carried by said stepper device for consecutively actuating said contacts, means connected with said contacts and said motor to stop said motor when one of said other cells is energized by light from one of said light chambers, and means stepwise turning said stepper device when said motor is actuated.

8. In an automatic dialing system, a movable source of light, photo cells receiving light from said source, a card support adapted to be placed between said photo cells and said source of light, whereby a card placed in said support and having perforations therein will regulate the flow of light to said cells, a dialing motor, a relay, means connecting said relay with one of said photo cells, whereby said relay is actuated by said photo cell, contacts connected with said relay and adapted to close when said relay is energized, another relay connected in series with said contacts, and contacts connected with said motor for actuating the same when the last mentioned relay is closed.

9. In an automatic dialing system, a dialing motor, a light carrying scanning device, means connected with said device and said motor for mooring said device, a plurality of photo cells receiving light from said scanning device, a separate pair of contacts connected with each cell, a relay connected in parallel with said contacts and said cells, means for selectively closing said contacts, contacts actuated by said relay, a source of electrical energy, and means connecting said motor in parallel with said relay-actuated contacts to said source of electrical energy.

10. In an automatic dialing system, a dialing motor, a scanning device movable by said motor, a plurality of sources of light carried by said scanning device, a plurality of photo cells adapted to be energized by said sources of light, said sources of light being arranged in pairs, a separate pair of contacts connected with each pair of light sources, means connecting said motor in parallel with said light sources and said contacts and including contacts, a relay for actuating the last-mentioned contacts, contacts connected with said relay, and a cell actuated relay for actuating the last-mentioned contacts.

11. In an automatic dialing system, a dialing motor, a scanning device movable by said motor, a plurality of light sources carried by said scanning device and arranged in two columns hereon, a plurality of elongated photo cells including a vertically positioned cell and other cells disposed horizontally one over the other opposite said light sources so that the light signal from any one of the light sources of the first column will strike the vertically disposed cell, and so that any one of the horizontally disposed cells may receive light from a separate light source of the second column, a separate pair of contacts connected with each horizontally disposed cell, a separate pair of contacts connected with each pair of light sources, a stepper wheel, brushes carried by said stepper wheel and movable thereby step by step to selectively close the two sets of contact pairs, and electromagnetic means for actuating said stepper wheel.

12. In an automatic dialing system, a dialing motor, a scanning device movable by said motor, a plurality of light sources carried by said scanning device, a plurality of photo cells adapted to be energized by said light sources, a separate pair of contacts connected with each of said cells, a brush selectively closing any pair of contacts, a stepper wheel carrying said brush, a solenoid for actuating said stepper wheel, contacts connected with said solenoid, a relay for actuating the last-mentioned contacts, said relay being connected in parallel to said cells and a source of electrical energy connected with said relay and said cells.

13. In an automatic dialing system in combination with a plurality of light sources and photoelectric cells receiving light from said light sources and separate contacts connected with each cell and each pair of light sources, a cell and light source selecting device comprising a stepper wheel, brushes carried by said wheel and closing selectively said contacts in predetermined positions of the wheel, a solenoid, a stepper arm actuated by said solenoid to move stepwise said stepper wheel, and means energizing said solenoid.

14. A device in accordance with claim 13 wherein said brushes close in a position of the stepper wheel, contacts corresponding to a specific cell and contacts connected with at least one light source illuminating the last mentioned cell.

15. A device in accordance with claim 11 comprising contacts maintaining connection between a source of electric energy and the light source while the motor is energized.

HENRY C. SAVINO.

REFERENCES CITED

The following references are of record in the file of this patent:

UNITED STATES PATENTS

| Number | Name | Date |
|---|---|---|
| 1,859,597 | Nason | May 24, 1932 |
| 1,880,105 | Reifel | Sept. 27, 1932 |
| 2,087,039 | McMaster | July 13, 1937 |
| 2,098,305 | Nichols | Nov. 9, 1937 |
| 2,100,518 | Rinkow | Nov. 30, 1937 |
| 2,111,154 | Nichols | Mar. 15, 1938 |
| 2,318,467 | Demeulenaere | May 4, 1943 |